(12) United States Patent
Al-Misfer

(10) Patent No.: US 8,801,276 B2
(45) Date of Patent: Aug. 12, 2014

(54) SYSTEM FOR MEASUREMENT OF MOLTEN SULFUR LEVEL IN RECEPTACLES

(75) Inventor: Adel S. Al-Misfer, Al-Hassa (SA)

(73) Assignee: Saudi Arabian Oil Company, Dhahran (SA)

(*) Notice: Subject to any disclaimer, the term of this patent is extended or adjusted under 35 U.S.C. 154(b) by 89 days.

(21) Appl. No.: 13/276,758

(22) Filed: Oct. 19, 2011

(65) Prior Publication Data

US 2012/0035880 A1    Feb. 9, 2012

Related U.S. Application Data

(62) Division of application No. 10/551,736, filed as application No. PCT/US2004/010177 on Mar. 30, 2004, now Pat. No. 8,109,670.

(60) Provisional application No. 60/459,037, filed on Mar. 31, 2003.

(51) Int. Cl.
 *G01K 3/00*    (2006.01)

(52) U.S. Cl.
 USPC ............. 374/112; 374/54; 374/137; 374/139; 374/166; 374/179; 702/130

(58) Field of Classification Search
 USPC ................... 374/110, 112; 73/295, 304 R
 See application file for complete search history.

(56) References Cited

U.S. PATENT DOCUMENTS

| | | | | |
|---|---|---|---|---|
| 2,930,232 A * | 3/1960 | Spears | | 73/295 |
| 3,111,031 A * | 11/1963 | Kuritza | | 73/295 |
| 3,184,970 A * | 5/1965 | McNelly | | 73/304 R |
| 4,672,842 A * | 6/1987 | Hasselmann | | 73/49.2 |
| 5,056,692 A * | 10/1991 | Wilford et al. | | 222/590 |
| 5,549,280 A * | 8/1996 | Kings et al. | | 266/78 |
| 5,669,956 A * | 9/1997 | Behring et al. | | 75/386 |
| 6,615,658 B2 * | 9/2003 | Snelling | | 73/295 |

* cited by examiner

*Primary Examiner* — Lisa Caputo
*Assistant Examiner* — Roger Hernandez-Prewit
(74) *Attorney, Agent, or Firm* — Abelman, Frayne & Schwab

(57) ABSTRACT

A portable temperature sensing probe having a plurality of thermocouples is inserted into a tank mounted on a truck or other receptacle at the time of loading a hot liquid, e.g., molten sulfur. The probe and at least a portion of the associated wiring or leads are attached to the loading pipe and/or discharge nozzle, and the probe is inserted into the interior of the tank before the molten sulfur is discharged. The signals from the plurality of thermocouples are amplified and the corresponding temperature information is transmitted to a display and control device. Due to the significant differential between the temperature of the rising molten sulfur and the vapors in the tank overhead space, the signals generated indicate which of the thermocouple are in contact with molten sulfur or the vapor zone. The generated signals adjust the shut-off valve that controls the flow of molten sulfur into the tank.

7 Claims, 8 Drawing Sheets

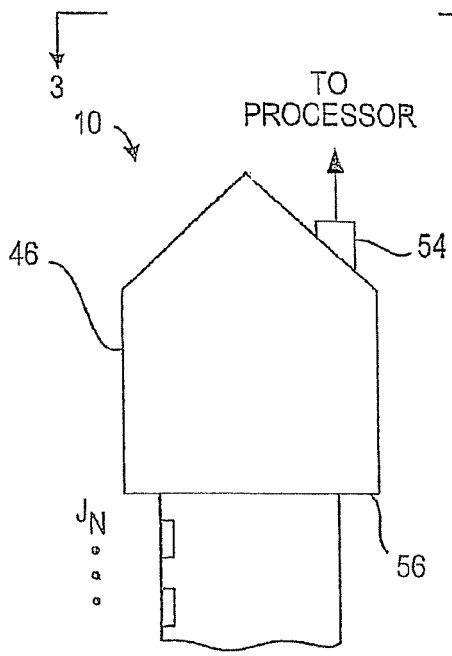
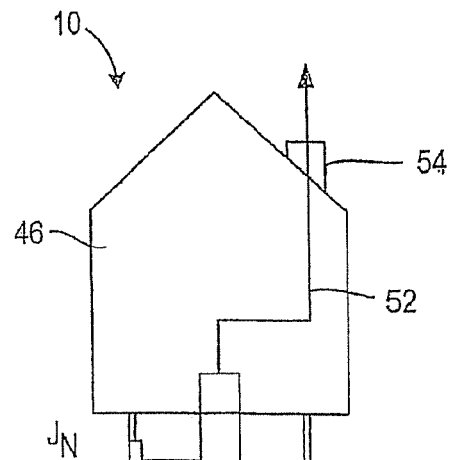
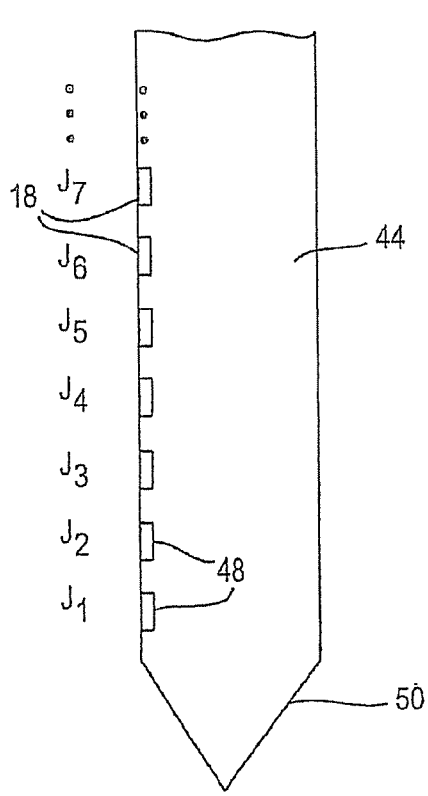
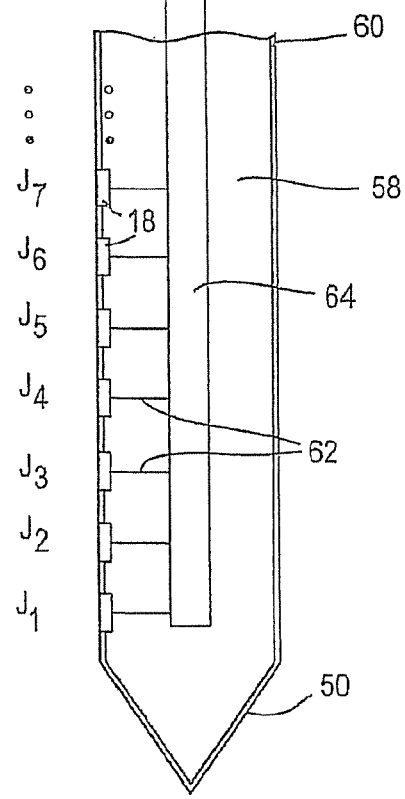
FIG. 2　　　　　　　　　FIG. 3

SYSTEM FOR MEASUREMENT OF MOLTEN SULFUR LEVEL IN RECEPTACLES

CROSS-REFERENCE TO RELATED APPLICATIONS

The present application is a divisional of U.S. application Ser. No. 10/551,736, filed on Feb. 28, 2007, which corresponds to PCT/US2004/10177, filed on Mar. 30, 2004, which claims priority on U.S. application No. 60/459,037, filed on Mar. 31, 2003, all of which are incorporated herein by reference.

FIELD OF THE INVENTION

The invention relates to the measurement and control of the flow of molten sulfur that is being added to a container or receptacle, for example, to a steam jacketed tank truck for transportation or to a sulfur pit for storage.

BACKGROUND OF THE INVENTION

Molten sulfur is produced as a natural raw material and as a by-product in chemical processes, such as the "sweetening" of crude oil. In order to transport the sulfur for eventual disposition, it is commonly maintained in a molten state so that it can be pumped and delivered through pipelines as a viscous liquid. Steam jacketed tank trucks are commonly utilized to transport the molten sulfur from an industrial production area to a storage location where it is typically pumped from the truck into a sulfur pit or storage tank.

It is important that the sulfur remains molten throughout the truck's tank and pumping system, since any solidification can seriously damage the pump.

The transporting tank trucks are equipped with a covered hatch into which a discharge or loading nozzle from a connecting pipe line is inserted. A shut-off valve is provided for either manual or electronic control of the flow-rate through the pipe line and nozzle into the interior of the tank.

One early method of determining when the molten stream should be shut off was to make a direct visual observation of the rising level of the sulfur in the tank. This method was inherently dangerous, since the molten sulfur has a tendency to splash and could cause severe burns on unprotected flesh. Furthermore, the fumes exiting the hatch as the liquid displaced the gases in the overhead are unpleasant at best, and could contain other vaporized compounds that are hazardous to health if inhaled.

Present methods of determining the temperature and the level of the molten sulfur as it rises in the truck's tank are not satisfactory. The use of instruments such as a capacitance and vibration probes, radar meter probes and ultra-sonic probes have proven to be unsatisfactory. As will be apparent to one of ordinary skill in the art, the result of cooling of the molten sulfur is its solidification on measuring instruments. Although viscous, the molten sulfur has a tendency to splash and the drops formed can rapidly cool to the solidification temperature. The encrusted sulfur has been found to interfere with the accurate performance of various types of liquid measurement instrumentation. The failure to obtain an accurate temperature reading can result in damage to the unloading pumps due to solidified sulfur.

One method for safely controlling the volume of molten sulfur loaded into a tank truck is to provide a scale at the loading station. The truck is weighed as it arrives empty at the loading station and the volumetric capacity of the truck is converted to the equivalent weight of molten sulfur to be loaded. As the weight of the truck approaches the predetermined capacity, the valve can be closed when the desired volume has been added. While this solution is satisfactory, the expenses of installation and subsequent maintenance of one or more scales at the tank truck loading stations is substantial.

It is therefore an object of the present invention to provide an apparatus and method for measuring the level of molten sulfur as the sulfur is discharged into a receptacle, such as a tank truck or storage tank or pit, that is relatively inexpensive and that can be used to reliably provide information on the level of molten sulfur or other similar hot molten materials. Another object of the invention is to provide a durable, damage-resistance measuring and signal-generating device, that can be completely automated for generating a control signal for actuating the molten sulfur flow shut-off valve.

SUMMARY OF THE INVENTION

The above objects and other advantages are achieved by the method and apparatus of the invention in which a portable probe having a plurality of thermocouples is inserted into the tank truck or other receptacle at the time of loading. In one preferred embodiment, the probe and at least a portion of its associated wiring or leads are attached to the loading pipe and/or discharge nozzle. In this embodiment, the temperature sensing probe is inserted into the interior of the tank before the molten sulfur is discharged.

The thermocouples or other temperature sensing and signal generating devices are secured in a vertical array, preferably on a non-electrically conductive elongated member. In a further preferred embodiment, the elongated member is surrounded, at least in part, by a protective sheath. If the sheath is metal or other thermally and/or electrically conductive material, the temperature sensing devices should be appropriately insulated or isolated from the sheath.

In a particularly preferred embodiment, the signals from the plurality of thermocouples are amplified and the corresponding temperature information is transmitted to a display device. The display device can include a direct display of the temperature at one or more of the thermocouple positions within the molten sulfur and in the overhead space in the interior of the tank.

In another embodiment, the temperature signal can be converted to provide a display of the volume and/or level of molten sulfur in the tank. As a result of the significant temperature differential between the rising molten sulfur and that of the vapors in the space defining the tank overhead, the signals generated will clearly indicate whether any particular thermocouple or group of thermocouples is in molten sulfur or in the vapor zone.

In a further preferred embodiment, the signals generated by the thermocouple array are further processed to control the shut-off valve that controls the flow of molten-sulfur into the tank. In this embodiment, one or more thermocouples at the upper end of the probe adjacent the loading hatch opening will generate signals that are converted to gradually reduce or quickly close the flow control valve. The particular programming of this function can be based on the geometry of the tank that is being loaded. For example, a circular tank will require smaller volume to raise the level a given distance as the tank approaches its full capacity. On the other hand, a tank having a more rectilinear cross-section with generally vertical sides can exhibit a more or less steady rise in level for a given volumetric flow rate. Similar considerations apply to sulfur pits or stationary tanks that have vertical sides and either a circular or rectangular cross-section.

As will be understood by those of ordinary skill in the art, a microprocessor can be programmed with information relating to the one or more types of tanks mounted on trucks that are being filled at a particular station in which the probe of the invention is in use. For example, if there are three different tank designs in use on vehicles used to transport molten sulfur, each can be given an arbitrary designation, such as type A, B and C. When the truck arrives at the station for filling, the operator or truck driver that is responsible for inserting the probe and discharge nozzle into the truck's filling hatch identifies the type of truck to be filled, e.g., by using a key pad, lever or other switch that is connected to the microprocessor control circuit.

An optional visual display indicating the volume or capacity of the particular type of tank can also be provided for use by the operator. An audible signal can also be provided to indicate when the tank reaches a predetermined condition, e.g., 90% full in order to alert the operator.

A further optional feature comprehended by the invention is to provide a different audible signal and/or emergency shut-off switch connected to the control valve in the event of a failure in the electronic measuring and/or mechanical control system.

BRIEF DESCRIPTION OF THE DRAWINGS

Preferred embodiments of the invention are described hereinbelow with reference to the drawings wherein:

FIG. 2 is a side elevation view of the probe of FIG. 1;

FIG. 3 is a cross-sectional view of the probe of FIG. 2, taken along line 3-3;

DETAILED DESCRIPTION OF THE INVENTION

Figure 1:
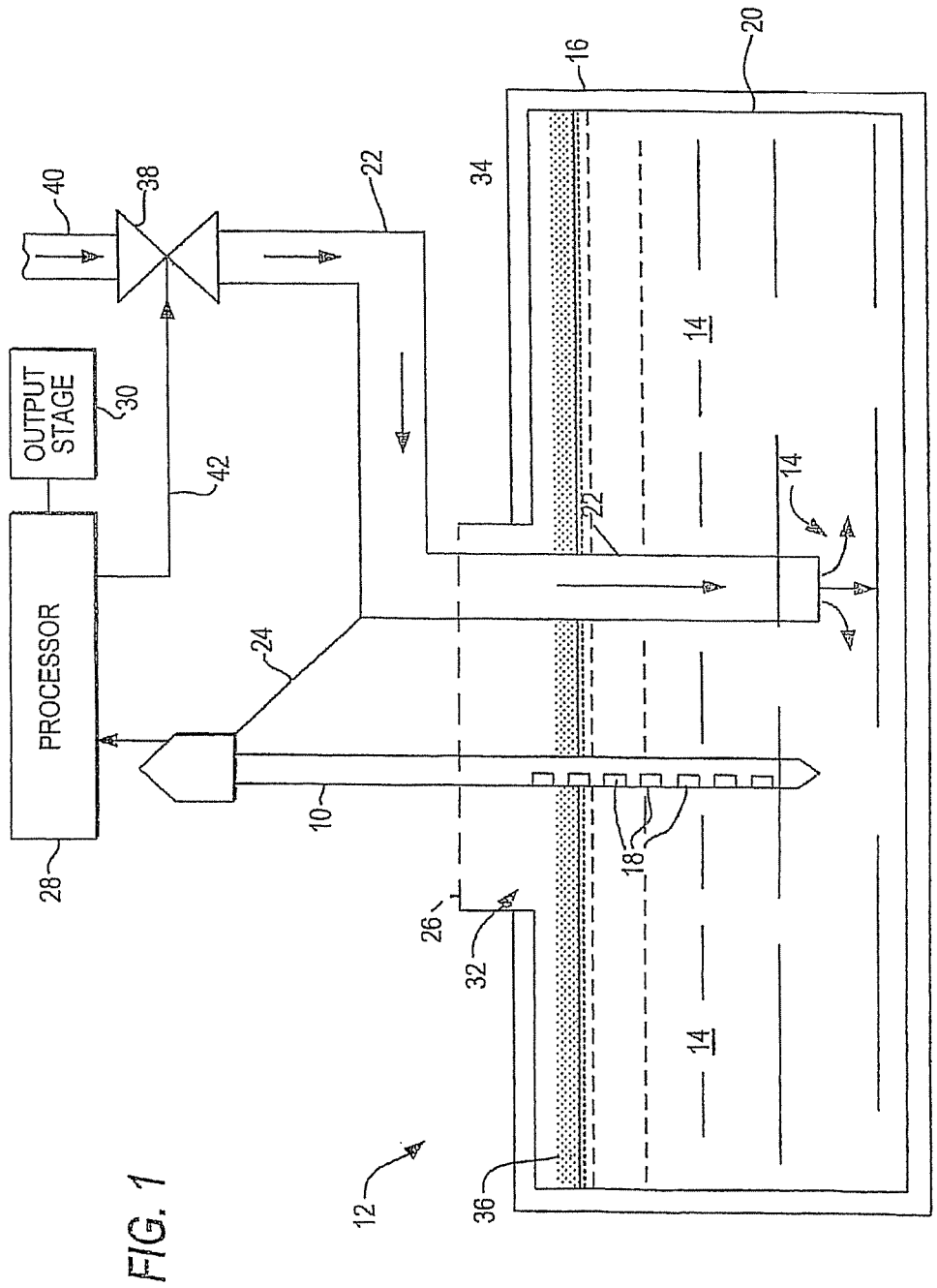
FIG. 1 is a schematic drawing of a loading system with a temperature sensing probe constructed in accordance with the present invention.

Referring to FIGS. 1-11, a portable temperature sensing probe 10 is used in a loading system 12 for loading a heated liquid material 14 into a container 16. The probe 10 includes a plurality of temperature sensing junctions 18 which directly contact the heated liquid material 14 when the probe 10 is inserted into the container 16, such as a tank mounted on a truck, a storage pit, or other stationary receptacle, at the time of loading the heated liquid material. In a preferred embodiment, the container 16 is a steam-jacketed tank having an inner compartment 20 for retaining the heated liquid material 14, for example, in a molten state.

In the exemplary embodiments described herein, the heated liquid material 14 is molten sulfur. In one preferred embodiment, the probe 10 and at least a portion of the wiring or conductive leads from the junctions 18 are attached to the loading pipe 22 and/or discharge nozzle, for example, by an optional coupling member 24 or other fastening devices. In this embodiment, the temperature sensing probe 10 is inserted through the container opening 26 into the interior of the container 16 simultaneous with the loading pipe 22 before the molten sulfur 14 is discharged and/or before additional molten sulfur is pumped into a partially filled container 16.

In a particularly preferred embodiment, the junctions 18 include modified thermocouples, and the signals from the plurality of thermocouples are amplified, with corresponding temperature information being transmitted as temperature signals to a processor 28 connected to the probe 10 for processing and output to an output stage 30, which can include a display device. The display device can include a direct display of the temperature at one or more of the thermocouple positions of the junctions 18 within the molten sulfur 14 and the overhead region 26 or vapor zone in the interior of the container 16 above the top surface 34 of the molten sulfur 14. In another embodiment, the temperature signals can also be converted to a display of the volume and/or level 34 of molten sulfur 14 in the container 16, such as a numerical or graphic display showing the volume in metric tons, as a percentage of the container capacity, or other informational display methods.

As a result of the significant temperature differential between the rising molten sulfur 14 and the vapors 36 overhead in the vapor zone 32 of the container 16, the signals generated will clearly indicate whether any particular thermocouple or group of thermocouples of the plurality of junctions 18 is in molten sulfur 14 or in the vapor zone 32.

In a further preferred embodiment, the signals generated by the thermocouple array of the plurality of junctions 18 are further processed by the processor 28 to control a shut-off valve 38 that controls the flow of molten sulfur 14 into the tank 16 from a source 40 of the molten sulfur 14. The processor 28 is connected to the valve 38 by a transmission connection 42, such as a wire, for transmitting a control signal from the processor 28 to a controller of the shut-off valve 38, for example, after a tank on a truck has been filled. The valve 38 can then be reset to start the loading of a new tank.

By controlling the flow of molten sulfur 14 or other liquid materials in which solidification is a concern, the invention using the probe 10 as described herein is suitable for use with other known methods and mechanisms for measuring and/or controlling the liquid level in the container 16.

In this embodiment, one or more thermocouples at the upper end of the probe 10 adjacent the loading hatch opening 26 will generate signals used to provide a control signal to gradually reduce or quickly close the flow control valve 38. The particular programming of this function can depend upon the geometry of the tank 16 that is being loaded. For example, a circular tank will require smaller volume to raise the level a given distance as the tank approaches its full capacity. On the other hand, a tank having more nearly vertical side walls and constant vertical cross-section will exhibit a more or less steady rise in level for a given volumetric flow rate.

The spacing of the temperature sensing and signal generating devices 18 can be determined by the tank shape and geometry to provide more data as the level of molten liquid reaches the desired position in the container. Two or more devices 18 can be placed in close proximity in order to provide fail-safe redundancy for each vertical location on the probe.

FIG. 2 is a side elevational view of the probe 10 of the invention, in which the probe 10 includes an elongated body 44 extending from a terminal head 46. A plurality of apertures 48 are provided in the outer surface of the body 44, in which a corresponding plurality of junctions 18, labeled $J_1, J_2, \ldots J_N$, are generally equidistantly positioned to contact molten sulfur when the body 44 of the probe 10 is inserted into the molten sulfur 14. The plurality of apertures 48 can be positioned in a row along one side of the body 44. Two or more junctions 18 can be located on the periphery at the same vertical location.

Lower end 50 of the body 44 can optionally be tapered to facilitate insertion of the probe 10 into the molten sulfur 14. The terminal head 46 is dimensioned to house a plurality of electrical signal conveying members, such as wires, extending internally from the junctions 18, as shown in FIG. 3, and out through a port 54 to be connected to the processor 28 to transmit signals from the junctions 18 to the processor 28. The conductors can be affixed to terminals in mating sockets to facilitate routine maintenance and repair of the components comprising the assembly.

In addition, the terminal head 46 can be dimensioned to include an edge 56 to allow the terminal head 46 to be grasped for manual manipulation for insertion and removal from the container 16, and optionally to rest on the edge of the opening 26 of the container 16 to prevent the probe 10 from falling completely into the molten sulfur 14 in the container 16. In addition, the coupling member 24 can be fastened to the, terminal head 46 and/or can include a loop through which the probe 10 is passed with the edge 56 resting on the loop to prevent the probe 10 from falling entirely into the container 16.

As shown in the cross-sectional view of FIG. 3, the junctions 18 are mounted into the side of a rod 58 composed of insulating material, for protecting the internally disposed electrical signal conveying members, such as wires, from the extreme temperatures of the molten sulfur 14, and for preventing electrical contact between electrically isolated junctions 18.

The rod 58 can optionally be surrounded by a protective sheath 60 forming the outer surface of the body 44 and having the plurality of small apertures 48 through which the junctions 18 are directly exposed to the molten sulfur 14 for the best heat conduction for accurate temperature sensing.

In a preferred embodiment, the sheath 60 is composed of stainless steel of relatively low thickness, and with a relatively small diameter, depending on the number of measuring junctions 18. By using stainless steel, the sheath 60 gives more support and protection to the probe 10 and the internal rod 58 when moving the probe 10 with the loading arm 22 during insertion into the container 16. Accordingly, the sheath 60 prevents damage to the junctions 18 during manipulation and use of the probe 10. The junctions should not be in contact with the heat conductive sheath.

The plurality of junctions 18 are electrically connected by the plurality of electrical signal conveying members, such as wires 62, to a data bus 64 for conveying electrical signals and optionally for providing electrical power to the junctions 18 from an external power source, for example, a voltage source provided by the processor 28. The data bus 64 also transmits electrical signals, such as voltages or currents, as the temperature sensing signals generated by the junctions 18 through the port 54 to the processor 28.

Figure 4:
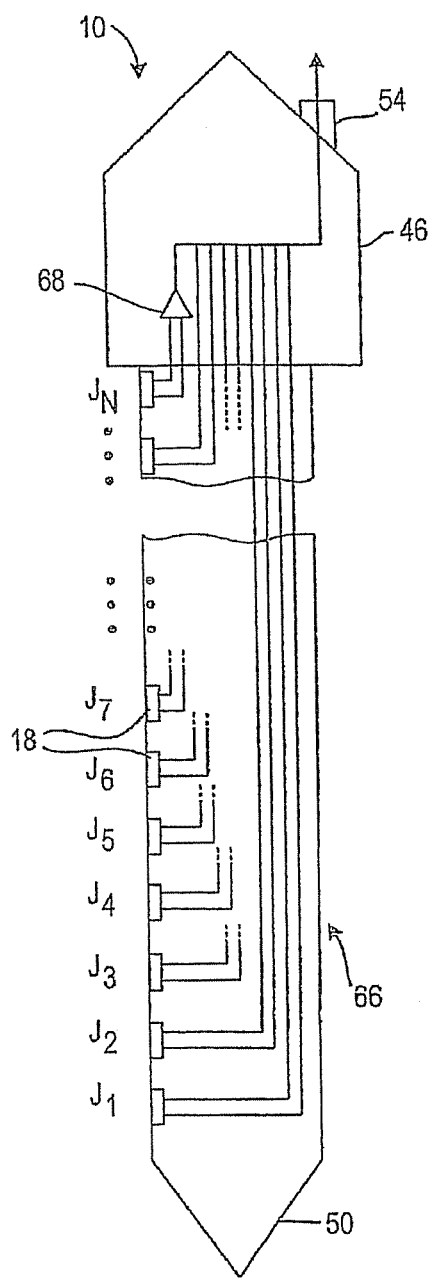
FIG. 4 is an exemplary embodiment of the probe of FIG. 3.

Referring now to FIG. 4 there is illustrated a first exemplary embodiment of the probe 10 of FIG. 3, with the data bus 64 including numerous individual wires 66 extending from the junctions 18, such that each individual junction 18 has at least two wires directly connecting the respective junction 18 to the processor 28 to transmit the temperature sensing signal to the processor 28 for processing. Optionally, an amplifier 68 can be positioned between an individual junction 18 and the processor 28, for example, as shown in FIG. 4 for junction $J_N$, for amplifying the respective temperature sensing signal for transmission to the processor 28. Since the temperature sensing signals from the junctions 18 can be voltages which are typically in the millivolt range, increasing the voltage output from the junctions 18 using the amplifiers 68 reduces errors and uncertainties in the temperature measurements. The use of amplifiers 68 also facilitates transmission of the temperature sensing signals to a processor 28 using analog components, as described below with reference to FIG. 10.

Alternatively, the processor 28 can include the amplifier 68 or an amplifier stage for amplifying some or all of the temperature sensing signals from the junctions 18. The number of junctions 18 and their respective wires in the data bus 64 can determine the length and thickness of the probe 10.

Figure 5:
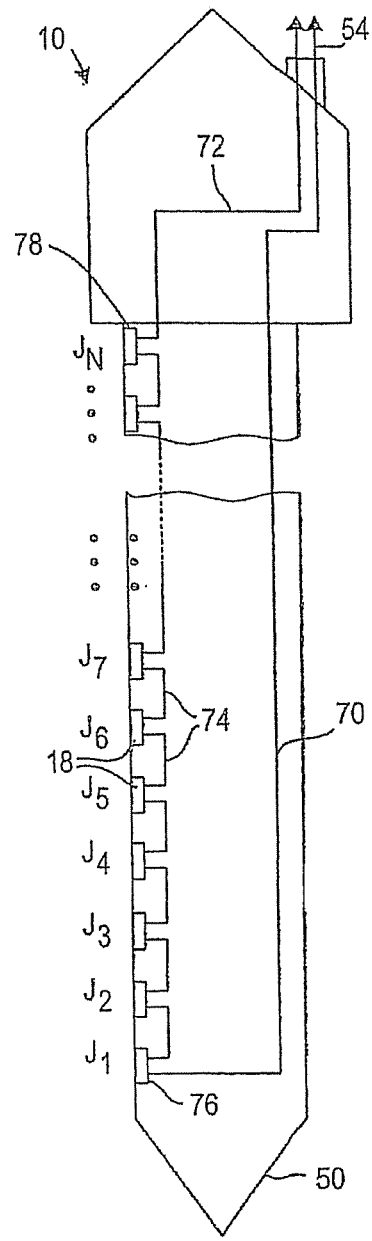
FIG. 5 is another exemplary embodiment of the probe of FIG. 3.

Referring to FIG. 5, a second exemplary embodiment of the probe 10, the data bus 64 includes wires 70, 72, 74. The first wire 70 connects the processor 28 with the lowermost junction 76, labeled $J_1$ and can provide an operating voltage. The second wire 72 connects the processor 28 to the uppermost junction 78, labeled $J_N$. The intermediate wires 74 connect successive junctions 18 in a series arrangement, such that the junctions 18 generate the temperature sensing signals to readily measure temperature differences along the row of junctions 18 extending along the length of the body 44 of the probe 10 while reducing the number of wires to the data bus 66.

Figure 6:
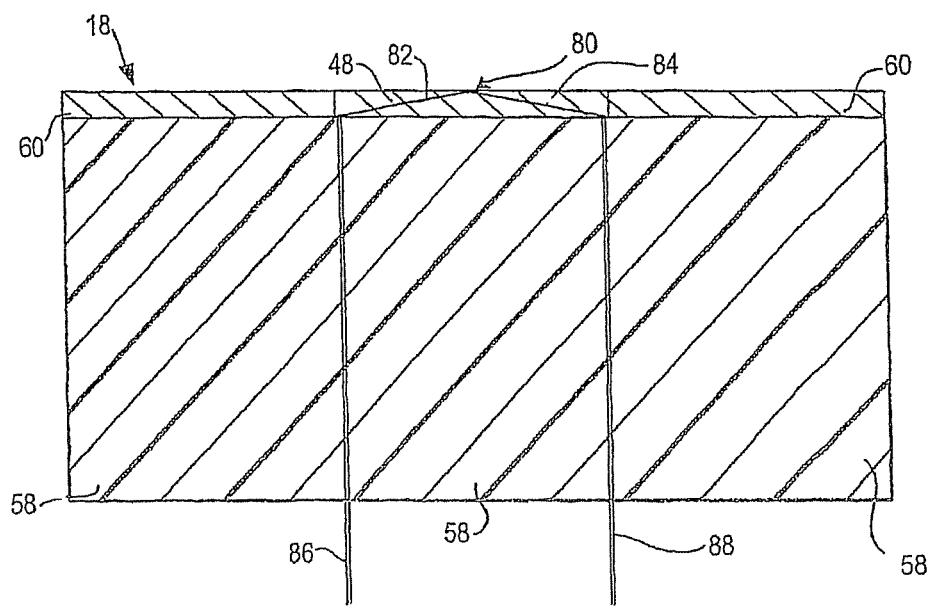
FIG. 6 is a side elevation view, in cross-section, of a junction of the probe of FIG. 2 using a thermocouple.

FIG. 6 is a cross-sectional view of one of the plurality of junctions 18 of the probe 10, in which the junction 18 is embodied as a thermocouple 80 positioned in the aperture 48 in the sheath 60. The thermocouple 80 includes a pair of wires 82, 84 connected to respective contacts 86, 88 which in turn extend through the insulating material of the rod 58 to be connected to the data bus 64 shown in FIG. 3. The wires 82, 84 are composed of dissimilar metals which produce an open circuit electromotive force (EMF) which is related to the temperature difference between the junction 18 and a reference junction. The EMF is a voltage which is the temperature sensing signal sent to the processor 28.

The reference junction can be the uppermost junction 78, labeled $J_N$, or alternatively can be the plurality of junctions 18 immersed in an ice bath prior to insertion of the probe 10 into the molten sulfur 14. Thermocouples 80 have a polarity, such that one wire 82 can be a positive wire and the other wire 84 is then the negative wire, which determines the flow of the EMF. In a preferred embodiment, the thermocouple 80 is a type K thermocouple, with positive wire 82 being composed of "CHROMEL" brand alloy, commercially available from HOSKINS MANUFACTURING COMPANY CORPORATION, with chemical composition Ni 90% and Cr 10%; and the negative wire 84 being composed of "ALUMEL" brand alloy, commercially available from HOSKINS MANUFACTURING COMPANY CORPORATION, with chemical composition Ni 94%, Mn 3%, Al2%, and Si1%. Such thermocouples are useful for molten liquids with temperatures ranging from −300° F. to 2300° F., and the temperature-to-voltage characteristics of these thermocouples are generally substantially linear for this combination of metals forming the thermocouples, and are particularly suitable for use with molten sulfur 14.

Figure 7:
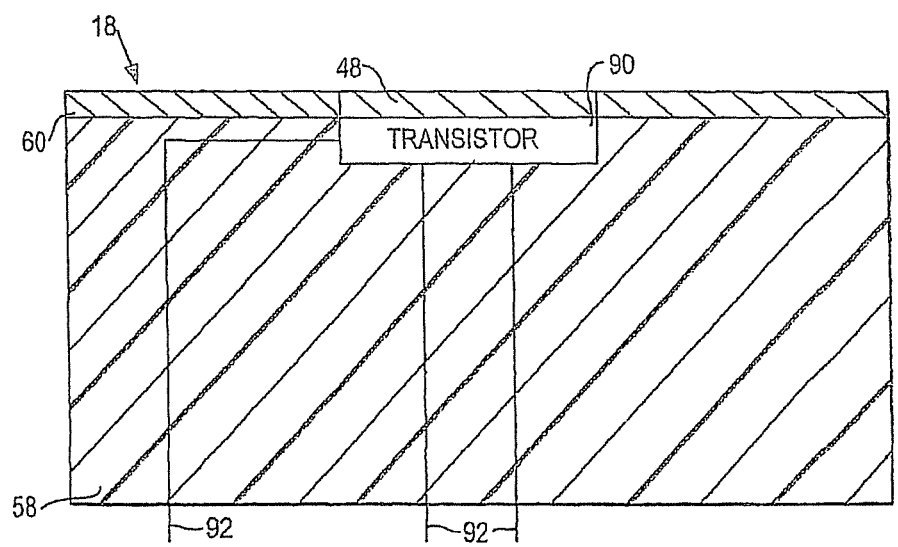
FIG. 7 is a view similar to FIG. 6 using a transistor.

In an alternative embodiment of the junction 18, FIG. 7 is a cross-sectional view of a junction 18 of the probe 10 using a transistor 90 having a plurality of leads 92 extending to the data bus 64. In this embodiment, the properties of transistors having voltage characteristics dependent on the temperature are used to measure differences in the temperature compared to a reference transistor. Since transistors can be installed with generally small dimensions and/or a generally large number of transistors can be installed over a given length of the probe 10, this embodiment using transistors can be manufactured to be of a small size so that the probe 10 has a smaller diameter and can be manufactured with a very large number of junctions 18 to provide a greater resolution in sensing temperature differences over the length of the probe 10.

Figure 8:
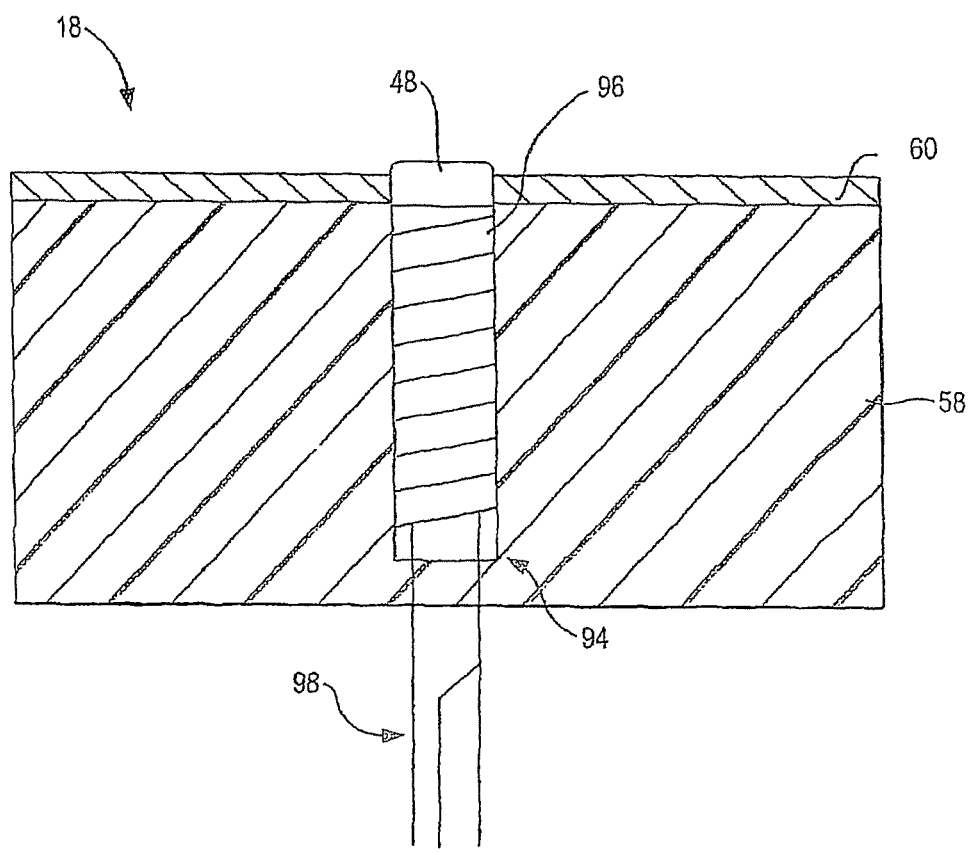
FIG. 8 is a view similar to of FIG. 6 using a resistance temperature detector.

In a further alternative embodiment of the junction 18, FIG. 8 is a cross-sectional view of a junction 18 using a resistance temperature detector (RTD) 94, which utilizes the temperature dependency of resistance, for example, a resistor 96, to detect the temperature of the molten sulfur 14 at the respective junction 18. As the resistance across the resistor 96 changes, the voltage and/or the current through the wires 98 changes, indicating the temperature. The RTD 94 can be a thin film platinum device of the type commercially available from OMEGA ENGINEERING, and can have a temperature range from −320° F. to 1,000° F.

Figure 9:
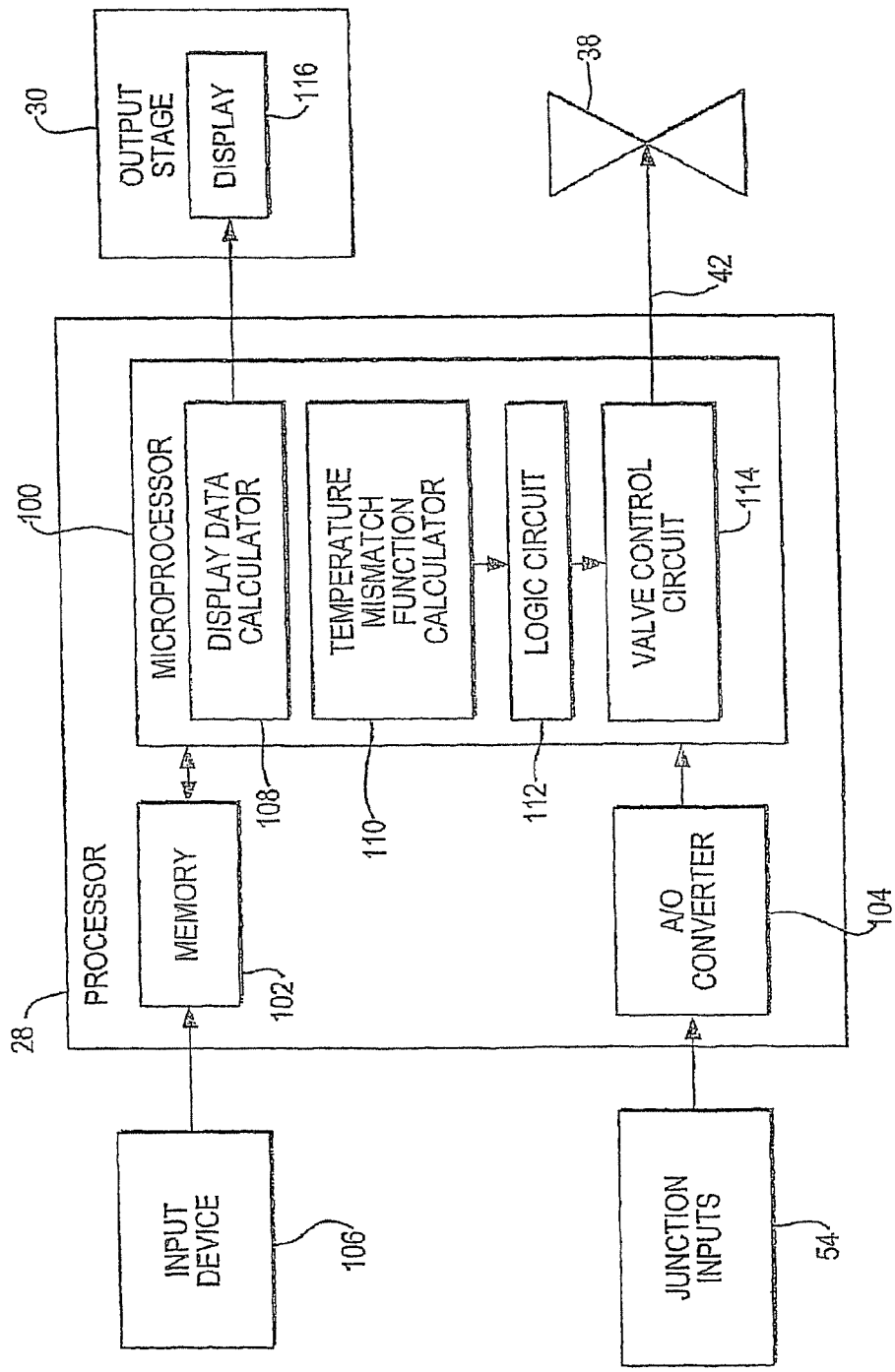
FIG. 9 is a schematic drawing of a representative processor for use in the loading system of FIG. 1.

As will be understood by those of ordinary skill in the art, the processor 28 can include components shown in FIG. 9 for receiving signals from the junctions 18 corresponding to temperatures of the molten sulfur 14, and digitally analyzing the temperatures to digitally control the valve 38. The processor 28 acts as a control circuit and can include a microprocessor 100 and a memory 102. Optionally, the receiving signals from the junction inputs via the port 54 are digitized using an analog-to-digital (A/D) converter 104 using A/D conversion methods known in the art.

The microprocessor 100 performs various calculations on the digitized signals from the A/D converter 104 using hardware and/or software which can be programmed with information stored in the memory 102 relating to the one or more types of trucks that are being filled at a particular station in which the probe 10 of the invention is in use. For example, if there are three different tank designs in use on vehicles used to transport molten sulfur, each can be given an arbitrary designation such as type A, B or C. When the truck arrives at the station for filling, the operator or truck driver that is responsible for inserting the probe 10 and discharge nozzle 22 into the truck's filling hatch 26 identifies the type of truck to be filled, e.g., by using the input device 106, such as a key pad, a lever, a switch or other device that is connected to the microprocessor-based control circuit of the processor 28.

In one embodiment, the microprocessor 100 includes a display data calculator 108, a temperature mismatch function calculator 110, a logic circuit 112, and a valve control circuit 114, implemented in hardware and/or software. The display data calculator 108 determines the various temperatures and related data from the temperatures detected by the probe 10 and stored in the memory 102. The related data can include the volume of the molten sulfur 14 in the container 16, the level of molten sulfur 14 in the container 16, the current or remaining maximum volume or capacity of the particular type of container 16, etc.

Such display data are output to the output stage 30 for display by a display device 116 for use by the operator, for example, to manually turn off the valve 38. Alternatively or in conjunction with visual indicators, an audible signal can also be provided using an audio device known in the art and included in the output stage 30 to indicate when the tank 16 reaches a predetermined condition, e.g., 90% full, in order to alert the operator. A further optional feature provides a different audible signal and/or emergency shut-off switch connected to the control valve 38 in the event of a failure of the processor 28 to operate as an electronic measuring and/or mechanical control system for the loading system 10.

Alternatively, the processor 28 can implement an automatic shut-off function, in which the valve 38 is automatically shut-off by the processor 28 when a shut-off condition occurs. In response to the temperature data received from the junctions 18 of the probe 10, the microprocessor 100 performs a temperature mismatch function using a temperature mismatch function calculator 110 to compare the temperatures of the plurality of junctions 18 with each other and/or with a reference temperature set by the operator through the input device 106.

A logic circuit 112 then determines from the compared temperatures whether a predetermined shut-off condition exists. If so, the logic circuit 112 sends a shut-off condition signal to the valve control circuit 114, which in turn sends a shut-off control signal to the valve 38 via the transmission connection 42 to immediately shut-off the valve 38 and so to stop the flow of molten sulfur 14 into the container 16. Alternatively, the valve control circuit 114 can be configured to gradually slow and then stop the flow of molten sulfur 14 over a predetermined duration.

The logic circuit 112 can perform-one or more predetermined tests for determining whether a shut-off condition exists. In one embodiment, the shut-off condition exists when the temperature at a higher level in the container 16 is higher than any temperature below that point. That is, with $T_i$ being the $i^{th}$ temperature measured by junction $J_i$, then the shut-off condition exists if:

$$T_i > T_j \text{ for some } i>j, \text{ for all } j=1, 2, \ldots, i-1.$$

This condition indicates that sulfur solidification has occurred at the bottom layers of the sulfur 14, and so shutting off the valve 38 and stopping the flow of the sulfur 14 in order to avoid damaging the pumps connected to the source 40 of the molten sulfur 14.

Alternatively, the logic circuit 112 can simply test only the lowermost junctions $J_1$, and $J_3$, such that if:

$$T_3 > T_2 > T_1$$

then the shut-off condition exists due to sulfur solidification at the lowermost layers of sulfur 14, and the valve 38 is shut off to avoid damaging the pumps.

Alternatively or in addition, logic circuit 114 determines the shut-off condition based on whether the temperature difference between the air in the vapor space 32 and the molten sulfur 14 is greater than a predetermined set temperature. The set temperature can be calculated to be the average temperature between the liquid and vapor phases.

For example, if SP equals the set point temperature, NT equals the normal liquid sulfur temperature, VT equals the vapor space temperature, RH equals the real height of the surface of the molten sulfur 34 as measured above the distal or lower end 50 of, the probe 10, RHi equals the real height of the junction height measured above the distal or lower end 50, RC equals the real clearance or distance between the generally equidistantly spaced junctions 18, and RM equals the high level where the valve 38 has to shut down, then sulfur, NT is about 300° F. and VT is about 120° F., so SP is about 210° F.

The microprocessor 100 then performs the following calculations:

$$SP=(NT+VT)/2,$$

let INDEX=0, $$RH=RH1+RC*\text{INDEX},$$

$T_1 >$ SP and RH < RM, then increment INDEX and repeat calculation of RH, but if $T_1 \leq$ SP or RH $\geq$ RM, then the shut off valve 38 is closed.

When the valve 38 is closed by this algorithm, the final value of RH determines the real height of the surface 34 of the molten sulfur 14 relative to the distal tip 50 of the probe 10.

Figure 10:
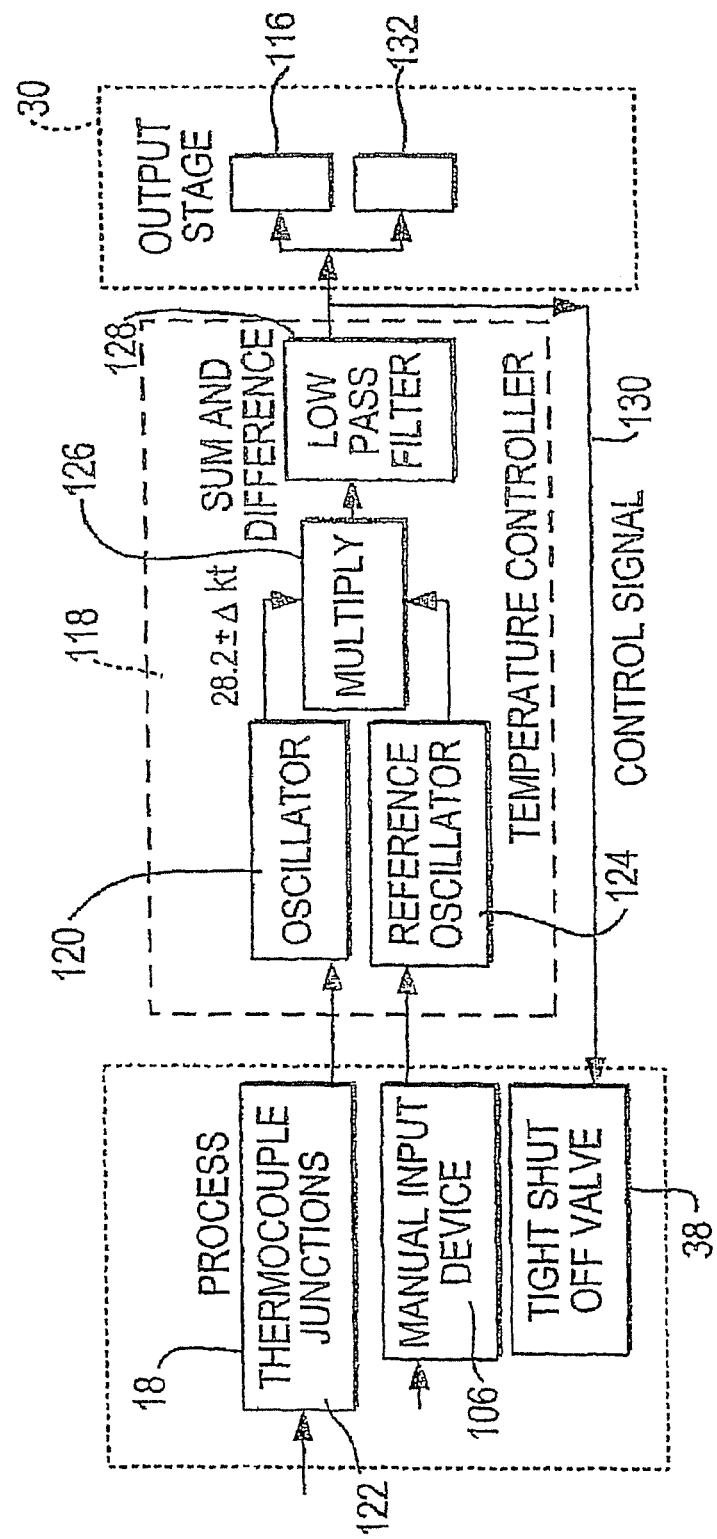
FIG. 10 is a schematic view of an alternative embodiment of a processor for use in the loading system of FIG. 1.

In all alternative embodiments, the processor 28 can function as a temperature controller 118 shown in FIG. 10 using an analog package and components to process analog temperature sensing signals from the junctions 18, such as thermocouples. As shown in FIG. 10, the analog temperature sensing signals are input to an oscillator 120 to generate amplified temperature signals. An operator sets a reference temperature using a manual input device 122. The reference temperature sets the output of a reference oscillator 124 to generate a reference signal, and a multiplier 126 multiplies the temperature signals from the thermocouple junctions 18 with the reference signal. The multiplied signal is applied to a low pass filter 128 to perform a temperature mismatch function when an upper temperature point has a predetermined differential value or a higher value than any of the temperature values below that point, which can indicate sulfur solidification of the lower portion of the sulfur 14 in the container 16.

In response to detecting such a temperature mismatch, the temperature controller 118 generate an output signal from the low pass filter 128 for transmission to the output stage 30. The output signal can include a control signal 130 which is transmitted to the shut off valve 38 to tightly shut the valve 38, for example, to loading the sulfur 14 into the container 16. In addition, the output signal can include the temperatures at each junction 18 for display or recording.

The output stage 30 uses the output signal to control a display 116 to display a numerical value of the temperatures at different times during the loading operation, as well as the equivalent level 34 of sulfur 14 in the container 16, and its equivalent capacity or weight in metric tons of sulfur depending on the geometry of the container 16. All of the data required for the calculations can be input into the analog package having the temperature controller 130 and the output stage 30.

For example, input device 106, such as a keypad, can be used to input the tank height, the junction or thermocouple heights, the minimum level height, the maximum or high level height which determines when to shut off the valve 38, and any alarm settings. Thus, the invention is useful to monitor the sulfur levels in addition to providing the automatic shut-off features.

The display 116 can also be activated to provide a warning light to be viewed by the operator of the system 12. The output signal can also be transmitted to an audio alarm device 132 to generate an audible warning to the operator.

Figure 11:
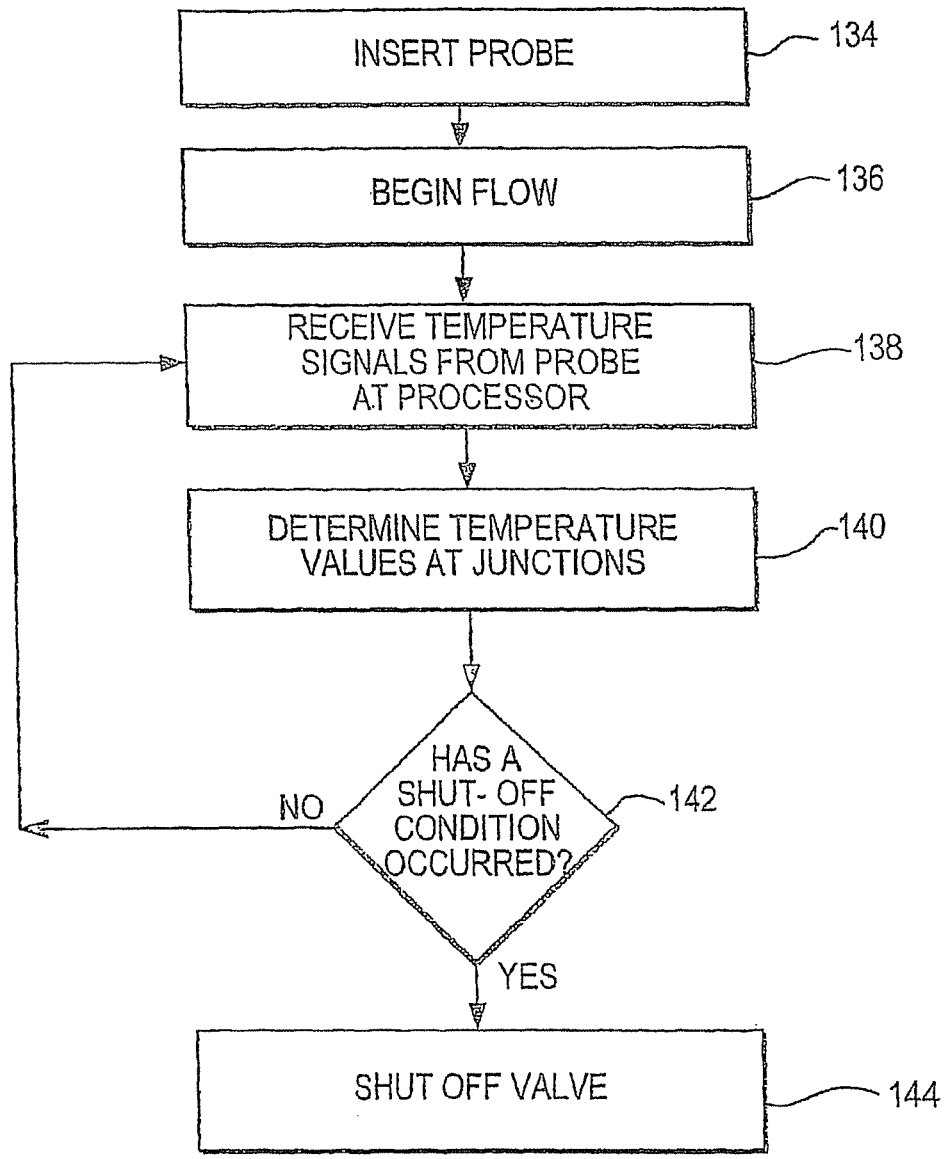
FIG. 11 is a flowchart illustrating one preferred mode for operating the loading system of FIG. 1.

FIG. 11 is a flowchart illustrating the operation of the invention, in which the probe 10 is inserted into the container 16 in step 134, and the molten sulfur 14 begins to flow in step 136. As the molten sulfur 14 fills the container 16, the processor 28 receives temperature signals from the probe 10 in step 138, which are generated by the junctions 18 contacting the molten sulfur 14 as the level 34 of molten sulfur 14 rises.

The processor 28 then determines in step 140 the temperature values at each respective junction 18, and the processor 28 determines if a shut-off condition has occurred in step 142. If not, the method loops back to repeat steps 138-142 until a shut-off condition is detected in step 142. The processor 28 then generates a control signal which is sent to the valve 38 to automatically shut off the valve 38 in step 144.

By providing automatic monitoring and measurement of the level 34 of the sulfur 14 and automatic shut off of values 38 when loading sulfur 14 into containers 16 such as tanks, the invention allows the operator to be at a distance from the opening 26 of the container 16, as so the invention eliminates the safety issues of exposing the operator to sulfur fumes, $SO_2$, and high $H_2S$ levels.

As will be appreciated by one of ordinary skill in the art, the probe is durable and resistant to damage due to ordinary inadvertent or careless handling during insertion, removal and storage by drivers or terminal operation personnel. Know cables and chemical-resistant sockets can be provided so that the processor, display and alarm devices can be located in an office or protective shelter away from contact with the molten sulfur or other product. As a separate component, the probe can be removed for repair and maintenance, and a replacement installed on the filler pipe.

Other modifications and features can be incorporated into the method and apparatus of the invention, the scope of which is to be determined by the claims that follow.

The invention claimed is:

1. A system for loading molten material into a container having an interior, said system comprising:

a loading pipe coupled to a source of molten material, said loading pipe having an outlet for discharging molten material into the interior of the container through an overhead container opening;

an elongated probe movable from a first position outside of the container into a second position in which at least a first portion of said probe is positioned vertically within the interior of the container; wherein said first portion contains a plurality of vertically spaced temperature sensing devices for producing electrical signals which vary as a function of sensed temperature such that, as molten material is discharged into the interior of the container through said loading pipe, said temperature sensing devices at vertically increased heights come into thermal contact with the molten material;

a processor system located outside of the container and electrically coupled to said sensing devices for receiving said electrical signals; wherein said processor system is programmed to calculating a value representing the current volume or level of molten material within the container based on physical properties of the container in combination with said electrical signals; and an external device coupled to the processor to provide an indication to a user of the current volume or level of molten material within the container; and further comprising an electrically controlled shutoff valve for controlling the flow of molten material through said loading pipe; wherein said processor system further includes programming means for monitoring said electrical signals and determining whether at least one shutdown condition has occurred; and wherein said processor system includes programming means for closing said shutoff valve in response to determining that a shutdown condition exists;

wherein the processor system is programmed for loading molten sulfur into an insulated container such that a vapor zone forms over the molten sulfur.

2. The system of claim 1, wherein said external device is a visual display.

3. The system of claim 1, wherein each temperature sensing device is coupled to the said processor system for providing output signals representative of sensed temperature of the respective sensing device; wherein said processor system is programmed to determine the existence of a shutdown condition when the temperature of a temperature sensing device at a first vertical position is higher than the temperature of at least one temperature sensing device at a second vertical position which is lower than said first vertical position, indicating that sulfur solidification may have occurred.

4. The system of claim 1, wherein the container is part of a vehicle, and wherein the loading pipe is selectively moveable from a delivery position in which said outlet is located in the interior of the container and a non-delivery position in which the outlet is located outside of the container.

5. The system of claim 4, wherein said probe is mechanically coupled to said pipe for movement with said loading pipe such that, when said probe is in said first position said loading pipe is in said non-delivery position, and such that, when said probe is in said second position said loading pipe is in said delivery position.

6. The system of claim 1, wherein said temperature sensing devices comprise a lowermost sensing device, an uppermost sensing device, and a plurality of intermediate sensing devices at vertical locations between said lowermost and uppermost sensing devices;
   wherein said lowermost sensing device is electrically coupled to said processor system;
   wherein said uppermost sensing device is coupled to said processor system;
   wherein said lowermost, uppermost, and intermediate sensing devices are serially connected to one another; and
   wherein said processor system outputs an operating voltage to one of said lowermost and uppermost sensing devices and receives output signals from the other of said lowermost and uppermost sensing devices, and wherein said processor system determines a value of the current level or volume based upon said output signals.

7. A system for loading molten material into a container having an interior, said system comprising:
   a loading pipe coupled to a source of molten material, said loading pipe having an outlet for discharging molten material into the interior of the container through an overhead container opening;
   an elongated probe movable from a first position outside of the container into a second position in which at least a first portion of said probe is positioned vertically within the interior of the container; wherein said first portion contains a plurality of vertically spaced temperature sensing devices for producing electrical signals which vary as a function of sensed temperature such that, as molten material is discharged into the interior of the container through said loading pipe, said temperature sensing devices at vertically increased heights come into thermal contact with the molten material;
   a processor system located outside of the container and electrically coupled to said sensing devices for receiving said electrical signals; wherein said processor system is programmed to calculate a value representing the current volume or level of molten material within the container based on physical properties of the container in combination with said electrical signals; and
   an external device coupled to the processor to provide an indication to a user of the current volume or level of molten material within the container; and
   wherein the processor system is programmed for loading molten sulfur into an insulated container such that a vapor zone forms over the molten sulfur.

* * * * *